United States Patent [19]

Siano

[11] Patent Number: 5,185,118
[45] Date of Patent: Feb. 9, 1993

[54] PROCESS AND DEVICE FOR THE PRODUCTION OF PANELS

[75] Inventor: Dante Siano, Cologno Monzese, Italy

[73] Assignee: Commer S.p.A., Milan, Italy

[21] Appl. No.: 534,910

[22] Filed: Jun. 8, 1990

[30] Foreign Application Priority Data

Jun. 9, 1989 [IT] Italy ............................... 20839 A/89

[51] Int. Cl.⁵ .............................................. B29C 67/14
[52] U.S. Cl. ..................... 264/257; 264/324; 425/397; 425/400; 425/DIG. 48
[58] Field of Search ....... 425/397, 400, 412, DIG. 48; 264/324, 257, 258

[56] References Cited

U.S. PATENT DOCUMENTS

| | | | |
|---|---|---|---|
| 3,466,706 | 9/1969 | Asano | 425/DIG. 48 |
| 3,593,376 | 7/1971 | Kister et al. | 425/400 |
| 3,827,683 | 8/1974 | Seborg et al. | 425/397 |
| 3,914,104 | 10/1975 | Dean et al. | 425/397 |
| 4,097,035 | 6/1978 | Shuman | 425/DIG. 48 |
| 4,101,252 | 7/1978 | Brown | 425/397 |
| 4,432,716 | 2/1984 | Kiss | 264/109 |
| 4,657,064 | 4/1987 | Hunter | 425/431 |
| 4,830,599 | 5/1989 | Okusaku et al. | 425/398 |
| 5,019,314 | 5/1991 | Barlando | 264/156 |
| 5,026,514 | 6/1991 | Haumiller et al. | 264/324 |

FOREIGN PATENT DOCUMENTS

| | | | |
|---|---|---|---|
| 58-126130 | 7/1983 | Japan | 264/257 |
| 59-187680 | 10/1984 | Japan | 264/257 |

Primary Examiner—Jay H. Woo
Assistant Examiner—Robert B. Davis
Attorney, Agent, or Firm—Millen, White, Zelano and Branigan

[57] ABSTRACT

A process for the production of shaped lined panels, of the type wherein the lining is positioned on a frame including a series of reference and adjusting pivots capable of being reversibly engaged by a pluality of corresponding reference holes provided on the lining. The process positions the pivots on the frame according to an arrangement which is a function of the arrangement of said plurality of holes in the covering and the shaped and correctly lined panel.

7 Claims, 1 Drawing Sheet

PROCESS AND DEVICE FOR THE PRODUCTION OF PANELS

BACKGROUND OF THE INVENTION

Field of the Invention

The present invention concerns a process and a device for the manufacture of lined panels, particularly for interiors of motor vehicles and vehicles in general.

Said panels are preferably formed by a supporting element consisting of a plate of thermoplastic material, being thick enough and featured as to provide the panel with adequate mechanical resistance, and by a covering which is often of mixed type, namely constituted by two portions of covering different from each other. Generally said portions respectively consist of calendered plastic, or imitation leather, and of fabric, lying contiguously on the molded plate. However, the mixed covering may be formed by two or more parts of differently colored calendered plastic or by two or more parts of different fabrics.

The reciprocal arrangement of the areas varies according to the panel design required; for instance, in the case of calendered/fabric, the fabric portion may occupy an area of the panel such as to be joined to the area covered with imitation leather by a junction line and/or open superimposition line, or may present one or more areas of fabric thoroughly comprised within the portion of imitation leather covering. In the latter case the junction and/or superimposition line is a line closed on itself. A panel of this type is generally manufactured by using dies formed by two complementary portions reproducing the final shape of the panel. The plate of preheated thermoplastic material and the covering, stretched on a positioning frame above said plate, are placed between the two portions of the die, which, when closing, couples them to each other thus forming the lined and molded panel.

However, the use of coverings of mixed type involves problems of correct positioning between covering and plate. In fact, during molding, the different covering areas, namely for instance the portions of fabric and imitation leather, must be positioned with sufficient precision in correspondence with the relevant areas on the plate they will occupy in the final configuration of the shaped and lined panel. An even higher precision is moreover required in the case where creation of the so-called "shadow effect" is desired, i.e. that particular aesthetic effect which is obtained by positioning the junction and/or superimposition line between the different materials of the covering inside corresponding slots provided on the supporting plate during molding. It is therefore obvious that the positioning of said junction line with respect to the plate must be as more precise as possible to preserve the narrow tolerance limits present in this case.

Said exact positioning is however made difficult by the fact that the covering, which is originally plate-like, is shaped following by the final shaping of the panel, so that the covering tends to displace under the action of the stresses and deformations occurring during the molding stage.

To ensure a correct positioning several types of techniques were used, such as for example the one featuring the use of half-dies wherein pressing members are provided, for instance dandy rolls, which carry the covering portion, in correspondence with the PVC/fabric junction line, in contact with the plate before the panel molding operation.

Said system allows the problem of exact positioning to be effectively solved, but it has also proved to be expensive and complex to be performed, mainly due to the need of producing half-dies provided with said dandy rolls.

OBJECTS OF THE INVENTION

An object of the present invention is therefore to overcome the abovementioned inconveniences of the known technique, and particularly to provide a process for manufacturing lined panels with limited cost of production. Another object of the invention is to provide a device to carry out the abovementioned process.

SUMMARY OF THE INVENTION

These objects are achieved by means of a process for the manufacture of shaped lined panels, of the type wherein a covering made of an at least partly deformable material, stretched on a positioning frame, is coupled for molding on a preheated plate of thermoplastic material, simultaneously with the shaping of said plate, characterized by the steps of providing on said covering, before its positioning on said frame, a first plurality of reference and adjusting means, and engaging said first plurality of adjusting means with a second plurality of corresponding reference and adjusting means provided on said frame, according to an arrangement which is a function of the arrangement of said first plurality in the shaped and correctly lined panel.

The invention moreover concerns a device to produce shaped lined panels, of the type essentially comprising a two-part die to couple a covering made of an at least partly deformable material, stretched on a positioning frame, with a preheated plate of thermoplastic material, simultaneously with the shaping of said plate, characterized in that said covering presents a first plurality of reference and adjusting means cooperating with a corresponding second plurality of reference means provided on said frame, said means present on the frame being positioned as a function of the final arrangement of said first plurality in the shaped and correctly lined panel.

Said invention allows a lined panel to be obtained by an extremely simple and economic process which ensures the actual exact positioning of the fabric portion of the covering with respect to the shaped panel.

BRIEF DESCRIPTION OF THE DRAWINGS

The invention will be now further described with particular reference to a preferred non-limiting embodiment, illustrated in the accompanying drawings, in which.

DESCRIPTION OF THE PREFERRED EMBODIMENTS

Figure 2:
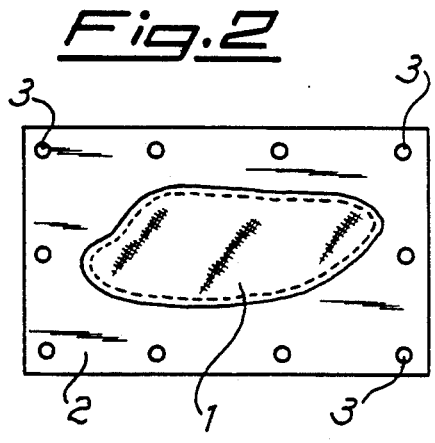
FIG. 2 is a plan view of a covering as obtained according to the present invention.
Figure 3:
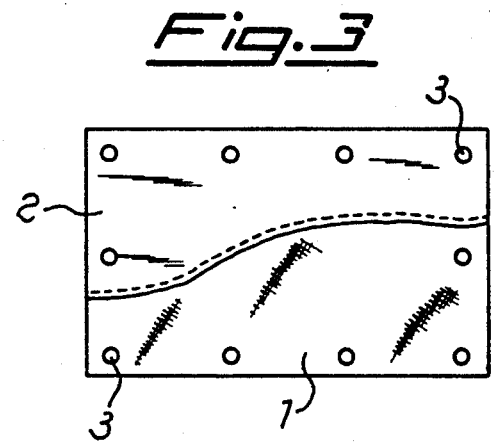
FIG. 3 is a view of a second embodiment of covering.

Referring first of all to FIGS. 2 and 3, two different embodiments of the covering are illustrated, in which a fabric portion 1 may be a medallion completely surrounded by an imitation leather portion 2 of the covering (FIG. 2) or may be connected to said imitation leather covering by an open junction line (FIG. 3).

Figure 4:
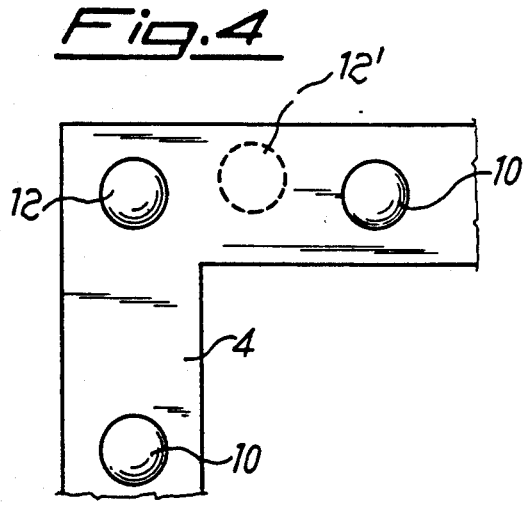
FIG. 4 is a magnified view, from the top, of a detail of the positioning frame.

Both embodiments show reference and adjusting holes 3 which will be engaged by reference and adjusting pivots 10 visible in FIG. 4. Said pivots 10 are positioned on a frame 4 according to an arrangement which is a function of the arrangement of said plurality of holes 3 on the shaped and correctly lined panel. In other words, the pivots 10 are offset with respect to the positions corresponding to the projections on the frame 4 of the holes 3 of the non-coupled covering (namely still in the plate form) and this offsetting keeps into consideration the distortions to which the covering itself is submitted during the coupling-shaping operation by molding.

In practice the pivots 10 are placed in positions which substantially correspond to those taken by the adjusting holes 3 with respect to the frame 4 after the operations of molding and coupling between covering and plate, in the case where said covering has been exactly positioned on the plate and on the mold with respect to the final shaping of the panel itself wherein the covering sheet 2 is bonded to a preheated thermoplastic plate 5 upon closing bottom and top die halves 6 and 7, respectively.

All above is exemplified in FIG. 4, where a magnified portion of the frame 4 is shown in which the position of a pivot according to the traditional technique and according to the invention has been indicated. In particular, reference 12' indicates the "traditional" position of the pivot, namely the one resulting from the projection of the corresponding hole of the covering on the frame before molding, while 12 indicates the position the same reference hole takes with respect to the frame 4 after molding. The process according to the invention, which with suitable adaptations of the dies can envisage also the presence of reference holes in the fabric portion of the covering of FIG. 2, thus allows exact positioning of the covering with respect to the plate of thermoplastic material in a simple, economic and highly reliable way.

In case one or more portions of the panel present a particularly prominent shaping, namely such as to cause extremely considerable stresses and deformations, the invention proposes a preshaping step of the covering itself.

Figure 1:
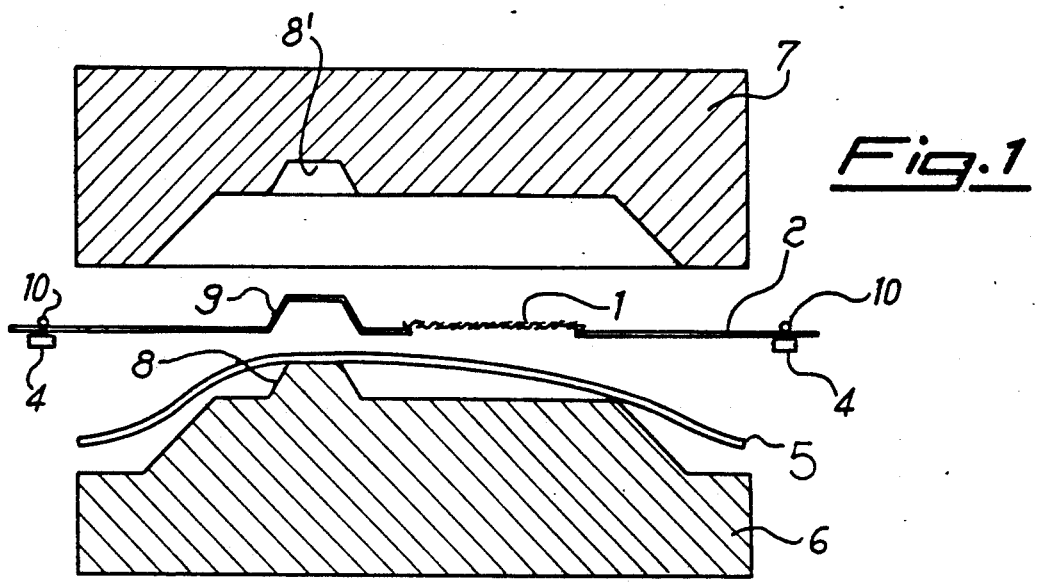
FIG. 1 is a cross-sectional view of a mold to produce lined panels according to the method of the present invention.

Said preshaping is obviously carried out in advance and only for the area concerned, in a way to obtain a semi-finished product of the type shown in FIG. 1, where preshaping in the form of at least one preshaped projection is indicated by reference 9 and provided in correspondence to the die portions 8 and 8', similarly shaped and provided on the half-dies 6 and 7 respectively.

Thanks to the present invention the preshaped area 9 remains correctly positioned with respect to portions 8 and 8' during the whole molding stage, thus allowing to reduce stresses to which the covering is submitted.

Figure 5:
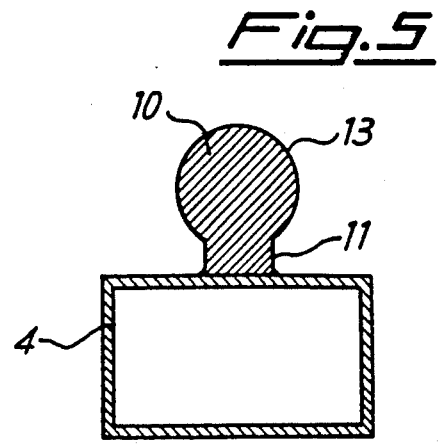
FIG. 5 is a magnified section view of a detail of the positioning frame.

Though the pivots 10 may present any form or shaping, preferably, as illustrated in FIG. 5, they are designed with an upper spherical portion 13 and a lower cylindrical portion 11 being smaller in diameter than said spherical portion. When the covering, possibly preshaped according to its final form, is positioned on the frame and fixed by means of the pivots which forcedly engage the covering holes, the particular shaping of the pivot with spherical head of greater diameter than the cylindrical portion, prevents the covering from sliding away under the action of stresses generated during molding.

Of course, the invention is not meant to be restricted to the use of the pivots/holes couple, but it comprises the use of any couple of corresponding reference and adjusting elements, where a first plurality of said elements is provided on the covering and a second corresponding plurality of reference elements is provided on the frame according to the abovementioned procedures.

I claim:

1. A process for the manufacture of shaped and lined panels, wherein a covering sheet having opposite edges made at least partly of deformable material is stretched on a positioning frame and the material is coupled by molding with a preheated plate of thermoplastic material; comprising the steps of:

providing on said covering sheet proximate opposite edges thereof, before its positioning on said frame, a first plurality of reference and adjusting means;

determining the actual arrangement of said first plurality of reference means over said frame in a shaped and correctly lined panel;

providing a second plurality of reference and adjusting means positioned on said frame according to said actual arrangement of said first plurality of reference means; and stretching the covering sheet on said frame with said first and second pluralities of reference means.

2. The process according to claim 1, wherein said first plurality of reference and adjusting means comprises a plurality of holes and said second plurality of reference and adjusting means consists of a plurality of pivots.

3. The process according to claim 1 further comprising the step of shaping or drawing at least part of said covering sheet before positioning the sheet on the frame.

4. The process according to claim 1, wherein the covering is formed by a peripheral area consisting of a leather-like plastic sheet and a central area of fabric and further comprising the step of arranging the first plurality of reference means along the edges of the covering sheet.

5. The process according to claim 1, wherein the covering is formed by a peripheral area of fabric and a central area of calendared plastic and further comprising the steps of arranging the first plurality of reference means along the edges of the covering sheet.

6. The process according to claim 1, wherein the molding with the preheated plate is a three-dimensional molding step with portions of the resulting panel being offset from one another.

7. The process of claim 1, wherein the covering sheet is preformed with at least one preformed projecting area so as not to be planar; wherein the preheated plate of thermoplastic material is draped over a first portion of a bottom die having at least one projecting portion aligned with the preformed projecting area in the covering sheet, and wherein a top die compliments the bottom die to bond the covering sheet to the plate of the thermoplastic material when pressing the sheet and plate together upon closing with the bottom die.

* * * * *